United States Patent [19]

Perratone

[11] Patent Number: 5,071,171
[45] Date of Patent: Dec. 10, 1991

[54] SWIVEL
[75] Inventor: René Perratone, Menton, France
[73] Assignee: Single Buoy Moorings Inc., Marly, Switzerland
[21] Appl. No.: 448,371
[22] Filed: Dec. 11, 1989
[51] Int. Cl.⁵ .............................................. F16L 27/08
[52] U.S. Cl. ..................................... 285/136; 285/190
[58] Field of Search ............... 285/136, 190, 273, 272, 285/132; 403/37, 39

[56] References Cited

U.S. PATENT DOCUMENTS

| | | | |
|---|---|---|---|
| 3,244,439 | 4/1966 | Montesi | 285/190 X |
| 3,990,731 | 11/1976 | Schnipke | 285/136 |
| 4,250,918 | 2/1981 | Tuson et al. | 285/136 X |
| 4,570,978 | 2/1986 | Arendt | 285/136 X |
| 4,577,892 | 3/1986 | Wrülich et al. | 285/190 X |
| 4,585,256 | 4/1986 | Rassieur et al. | 285/190 |
| 4,858,962 | 8/1989 | Bölling et al. | 285/136 |
| 4,955,643 | 9/1990 | Bona et al. | 285/190 |

Primary Examiner—Peter M. Cuomo
Attorney, Agent, or Firm—Young & Thompson

[57] ABSTRACT

Swivel comprising two bodies being rotatable with regard to each other wherein the inner body is provided with several inlet ports opening to a ring-shaped channel defined between both bodies.

2 Claims, 2 Drawing Sheets

SWIVEL

BACKGROUND OF THE INVENTION

The subject invention relates to a swivel. Fluid swivels are used when a flow of e.g. fluid has passed through connected parts which are rotatable with regard to each other. A swivel is known from EP-A-O 013 454. If the quantity of product is large several swivels can be stacked on top of one another, each transferring a portion of the fluid product.

Several swivels not only represent a bigger cost expenditure but also increase the chance of seal failure due to the inherent number of seals involved.

The invention aims to lessen the above cost and the risk of seal malfunctions and to obviate the use of a separate manifold.

SUMMARY OF THE INVENTION

The subject invention relates to a swivel which comprises an inner body having at least one inlet opening and an outer body being rotatable with respect to the inner body, and has at least one outlet opening, wherein between the inner body and the outer body a ring-shaped channel is delimited, the improvement comprising in that at least two inlet openings are provided opening into the ring-shaped channel.

It has been found that the area of the inlet opening(s) determines the flow capacity of the swivel. It has to be understood that as used herein the term "inlet and outlet opening" can be used in reverse sense, i.e. the direction of fluid flowing through the swivel can be reversed. The use of several inlet openings within the inner body of the swivel, obviates the necessity of providing a manifold within the lower buoy body.

According to a preferred embodiment the size of the swivel could further optimized by providing at least two outlet openings.

DESCRIPTION OF THE FIGURES

The invention will be further elucidated by reference to an embodiment shown in the drawing, wherein.

In FIG. 1 a device is schematically shown for mooring a vessel 2 with a single buoy 1 by a cable 3. A fluid product originating from several spots of the sea or lake bed 4 is transported through conduits 5, 6, 7 to buoy. The lower part of the buoy 1, referred to by 8, is connected through anchoring chains 9 with sea or lake bottom 4. The upper part of the buoy 1, indicated by 10, is rotatably mounted with regard to the lower part 8. Fluid product from the upper part of the buoy is transported to vessel 2 through conduit 11. The swivel according to the invention is positioned between upper part 10 and lower part 8 of the buoy and shown more detailed in cross section in FIG. 2. The swivel comprises three inlets, of which two are shown, indicated by 13 and 14, to which conduits 5 and 6 are connected. Both inlets 13 and 14 open from separate and distinct passages provided longitudinally through the inner body 21 and enter into the ring-shaped channel 15 which is provided with outlets 16 and 17 (see FIG. 3). In FIG. 3 also the third inlet 18 which connects to conduit 17 is clear. A sealingly rotatable connection between the inner body 21 and the outer body 22 is assured by seals 19 and bearing 20 known as such. Having the same capacity as a device comprising several stacked swivels it is possible by providing more than one inlet to use only one rotatable swivel, which is of course a very efficient solution. Because of the invention it is also possible to eliminate a manifold in lower part 8 and connect conduits 5, 6 and 7 directly to inlets 13, 14, 18 resp. In using such a device it is not necessary to stack several swivels above each other, nevertheless if several different fluid products are to be transferred the invention can still be arranged in a stacked form with each multi-entry/exit swivel performing its own transfer duty, without mixing of fluids.

Figure 1:
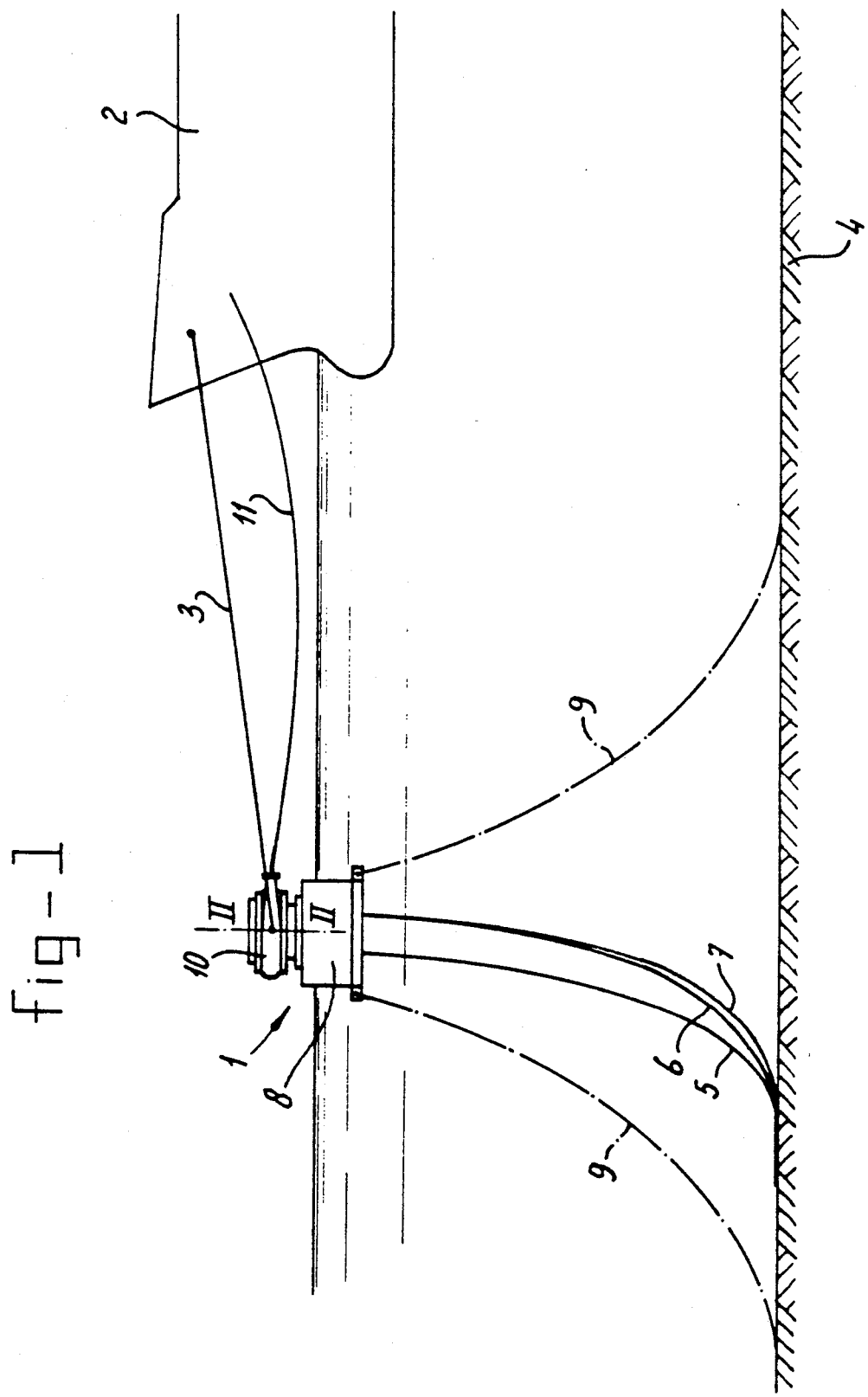
FIG. 1 shows in elevation a device wherein a swivel according to the invention can be used.
Figure 2:
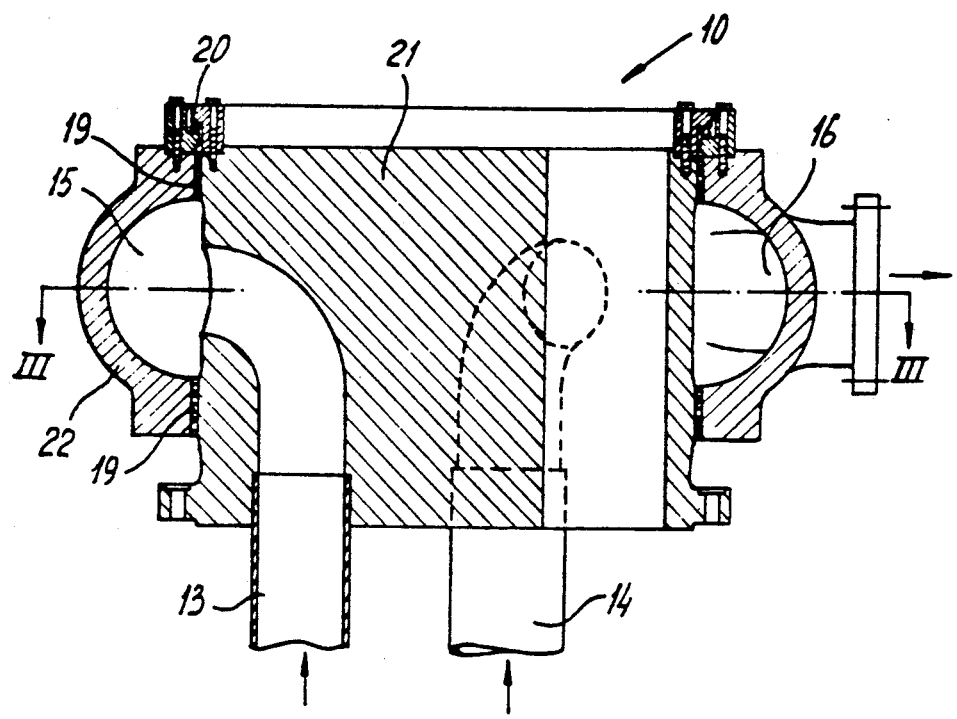
FIG. 2 shows a cross section along line II—II in FIG. 1 in enlarged scale.
Figure 3:
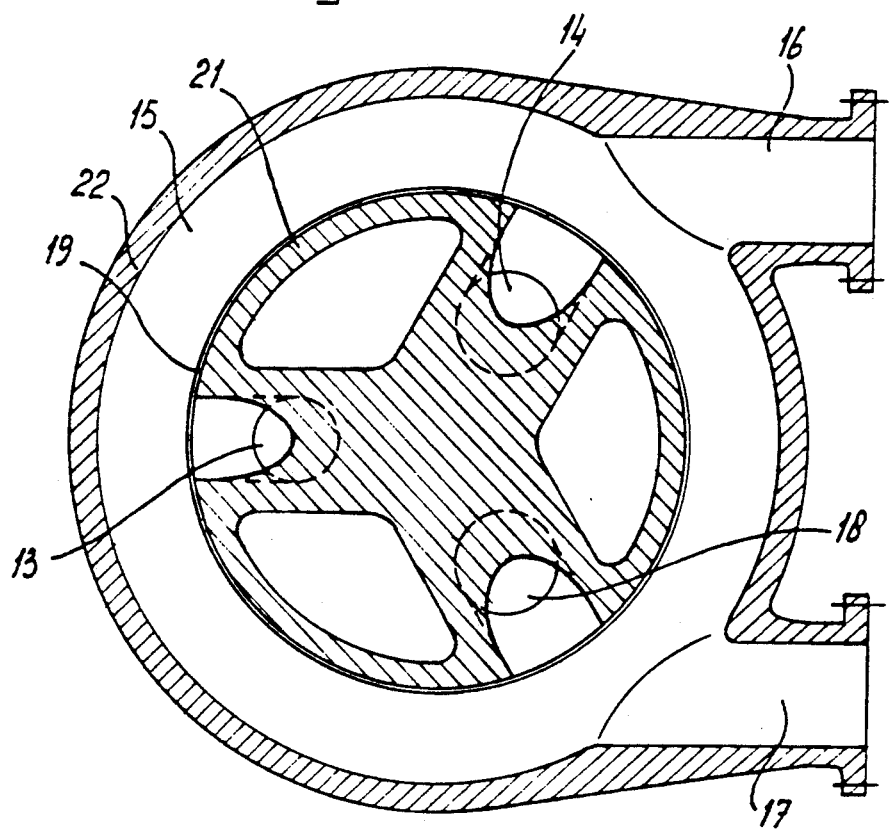
FIG. 3 shows a cross section according to III—III in FIG. 2.

Although the invention has been described relating to the transport of fluids from the sea bottom to a storage vessel it has to be understood that the swivel, described above, can be used for all kinds of other purposes known in the art and that the direction of the flow can also be opposite to the one described here, without leaving the scope of protection of the subject application as defined in the following claims.

I claim:
1. In a swivel comprising an inner body having at least one inlet opening and an outer body, being fully rotatable with respect to the inner body and having at least one outlet opening wherein between the inner body and the outer body a single ring-shaped channel is delimited which is a complete annulus, the improvement wherein at least two separate and distinct inlet passages extend longitudinally through the inner body to provide at least two inlet openings which open from said inner body into the ring-shaped channel.

2. Swivel according to claim 1, wherein at least two outlet openings are provided from said outer body.

* * * * *